(12) United States Patent
Turner

(10) Patent No.: US 8,115,519 B2
(45) Date of Patent: Feb. 14, 2012

(54) PHASE ACCUMULATOR GENERATING REFERENCE PHASE FOR PHASE COHERENT DIRECT DIGITAL SYNTHESIS OUTPUTS

(75) Inventor: Steven E. Turner, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 129 days.

(21) Appl. No.: 12/704,840

(22) Filed: Feb. 12, 2010

(65) Prior Publication Data
US 2011/0199127 A1 Aug. 18, 2011

(51) Int. Cl.
*H03B 21/00* (2006.01)
(52) U.S. Cl. ...................................... 327/105; 327/107
(58) Field of Classification Search .................. 327/105, 327/107; 708/276
See application file for complete search history.

(56) References Cited

U.S. PATENT DOCUMENTS

| | | | |
|---|---|---|---|
| 6,331,830 B1 | 12/2001 | Song et al. | |
| 6,587,863 B1 * | 7/2003 | Gentile et al. | 708/276 |
| 7,542,812 B2 | 6/2009 | Stroili et al. | |
| 7,565,392 B2 | 7/2009 | Turner | |
| 7,768,355 B2 * | 8/2010 | Patterson | 331/1 A |
| 2006/0109061 A1 | 5/2006 | Dobson et al. | |
| 2008/0019422 A1 | 1/2008 | Smith et al. | |
| 2008/0048897 A1 | 2/2008 | Parthasarthy et al. | |
| 2009/0121796 A1 | 5/2009 | Patterson | |
| 2009/0248772 A1 | 10/2009 | Turner | |

OTHER PUBLICATIONS

Manandhar et al., A 20-GHz and 46-GHz, 32x6-bit ROM for DDS Application in InP DHBT Technology, IEEE, 2006, pp. 1003-1006.
Manandhar et al., 36-GHz, 16x6-Bit ROM in InP DHBT Technology Suitable for DDS Application, IEEE Journal of Solid-State Circuits, Feb. 2007, pp. 451-456, vol. 42, No. 2.
Murphy et al., All About Direct Digital Synthesis, Analog Dialogue 38-08, Aug. 2004, pp. 1-5, http://www.analog.com/analogdialogue.
Semiconductor device fabrication, Wikipedia, Feb. 8, 2010, pp. 1-7, http://en.wikipedia.org/wiki/Semiconductor_device_fabrication.
Turner et al, 4-Bit Adder-Accumulator at 41-GHz Clock Frequency in InP DHBT Technology, IEEE Microwave and Wireless Components Letters, Mar. 2005, pp. 144-146, vol. 15, No. 3.
Turner et al., Benchmark Results for High-Speed 4-bit Accumulators Implemented in Indium Phosphide DHBT Technology, IEEE Lester Eastman Conference on High Performance Devices, Rensselaer Polytechnic Institute, Aug. 4-6, 2004, pp. 1-16.
Turner et al., Direct Digital Synthesizer With ROM-Less Architecture at 13-GHz Clock Frequency in InP DHBT Technology, IEEE Microwave and Wireless Components Letters, May 2006, pp. 296-298, vol. 16, No. 5. Turner et al., Direct Digital Synthesizer With Sine-Weighted DAC at 32-GHz Clock Frequency in InP DHBT Technology, IEEE Journal of Solid-State Circuits, Oct. 2006, pp. 2284-2290, vol. 41, No. 10.
Turner, Steven Eugene, High-Speed Digital and Mixed-Signal Components for X- and KU-Band Direct Digital Synthesizers in Indium Phosphide DHBT Technology, A Thesis, May 2006, 172 pages.
Turner et al., ROM-Based Direct Digital Synthesizer at 24 GHz Clock Frequency in InP DHBT Technology, IEEE Microwave and Wireless Components Letters, Aug. 2008, pp. 566-568, vol. 18, No. 8.

* cited by examiner

*Primary Examiner* — Lincoln Donovan
*Assistant Examiner* — John Poos
(74) *Attorney, Agent, or Firm* — Finch & Maloney, PLLC; Neil F. Maloney

(57) ABSTRACT

A phase accumulator generates phase data for a direct digital synthesis (DDS) device based on a reference phase to provide analog sinusoidal outputs that are locked to the reference phase and thus phase coherent. The frequency of a sinusoidal DDS output may be controlled by changing a frequency control word (FCW) provided to the phase accumulator without affecting the incrementing reference phase. The sinusoidal DDS output is based on a multiple of the FCW and the reference phase and thus remains locked to the reference phase, providing phase coherency even when the FCW changes to change the frequency.

20 Claims, 5 Drawing Sheets

PHASE ACCUMULATOR GENERATING REFERENCE PHASE FOR PHASE COHERENT DIRECT DIGITAL SYNTHESIS OUTPUTS

TECHNICAL FIELD

The invention relates to direct digital synthesis, and more particularly, to a phase accumulator generating a reference phase for providing phase coherent direct digital synthesis outputs that are locked to the reference phase.

BACKGROUND

Direct digital synthesis (DDS) has been used to produce analog waveforms, such as a sine wave, of various frequencies and profiles. The ability to produce the waveforms accurately and to control the waveforms may be important for various applications and industries such as communications and electronic warfare. DDS devices generate a time-varying signal in digital form and then perform a digital-to-analog conversion. DDS devices generally provide fast switching between output frequencies, fine frequency resolution, and operation over a broad spectrum of frequencies.

A DDS device may generally include a phase accumulator, a phase-to-amplitude converter, and a digital-to-analog converter (DAC). The frequency of a DDS output generally depends on a reference clock frequency and a binary number input to the phase accumulator (referred to as a frequency control word). The phase accumulator computes phase values representing phase angles and the phase-to-amplitude converter outputs digital amplitude values corresponding to the phase values (e.g., a sine of the phase angle). The DAC converts the digital amplitude values into a corresponding analog amplitude (e.g., voltage or current), thereby producing an analog sinusoidal output signal.

Although conventional DDS devices provide accurate analog waveforms and allow the frequency to be changed, conventional DDS devices are associated with shortcomings.

SUMMARY

Consistent with one embodiment, a direct digital synthesis (DDS) device includes a polyphase accumulator configured to generate a plurality of digital phase signals in response to a clock signal and a frequency control word. Each of the digital phase signals represents phase data corresponding to phase points on a sinusoidal waveform. The phase data is based on multiples of the frequency control word and an incrementing reference phase such that the digital phase signals remain locked to the incrementing reference phase when the frequency control word changes. The DDS device also includes a plurality of phase-to-amplitude converters coupled to the polyphase accumulator and configured to produce a plurality of digital amplitude signals in response to the digital phase signals, respectively. The digital amplitude signals represent digital amplitude data corresponding to the phase points on the sinusoidal waveform. The DDS device further includes a multiplexer coupled to the phase-to-amplitude converters and configured to multiplex the digital amplitude signals from the phase-to-amplitude converters to produce a multiplexed digital amplitude signal and a digital-to-analog converter coupled to the multiplexer and configured to convert the digital amplitude data represented by the multiplexed digital amplitude signal into an analog output to produce an analog sinusoidal signal.

Consistent with another embodiment, a DDS device includes a phase accumulator configured to produce an incrementing reference phase in response to a clock signal and configured to multiply the incrementing reference phase by a frequency control word to produce a digital phase signal representing phase data corresponding to phase points on a sinusoidal waveform. The digital phase signal remains locked to the incrementing reference phase when the frequency control word changes. The DDS device also includes a phase-to-amplitude converter coupled to the phase accumulator and configured to receive the digital phase signal and to provide a digital amplitude signal in response to the digital phase signal. The digital amplitude signal represents digital amplitude data corresponding to the phase points on the sinusoidal waveform. The DDS device further includes a digital-to-analog converter coupled to the phase-to-amplitude converter and configured to receive the digital amplitude signal and to convert the digital amplitude data represented by the digital amplitude signal into an analog output to produce an analog sinusoidal signal.

Consistent with a further embodiment, a method is provided for direct digital synthesis. The method includes: producing at least one digital phase signal in response to a clock signal and a frequency control word, the digital phase signal representing phase data corresponding to phase points on a sinusoidal waveform, the phase data being based on multiples of the frequency control word and an incrementing reference phase such that the digital phase signal remains locked to the incrementing reference phase when the frequency control word changes; converting the phase data represented by the digital phase signal into digital amplitude data to produce at least one digital amplitude signal in response to the at least one digital phase signal, the digital amplitude data corresponding to the phase points on the sinusoidal waveform; and converting the digital amplitude data represented by the digital amplitude signal into an analog output to produce an analog sinusoidal signal.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

As previously explained, conventional DDS devices are associated with shortcomings. One subtle and non-trivial such shortcoming is that conventional DDS devices do not provide phase coherency when the frequency changes. For example, when a frequency changes from a first frequency to a second frequency and back to the first frequency, the phase of the output at the first frequency does not necessarily or consistently match the phase of the output when the first frequency was initially applied. For certain applications, such as electronic warfare systems and various commercial communication applications, phase coherency is desired.

A phase accumulator, consistent with embodiments described herein, generates phase data for a direct digital synthesis (DDS) device based on a reference phase to provide analog sinusoidal outputs that are locked to the reference phase and thus phase coherent. The frequency of a sinusoidal DDS output may be controlled by changing a frequency control word (FCW) provided to the phase accumulator without affecting the incrementing reference phase. The sinusoidal DDS output is based on a multiple of the FCW and the reference phase and thus remains locked to the reference phase, providing phase coherency even when the FCW changes to change the frequency, as will be described in greater detail below.

As used herein, "phase coherent" or "phase coherency" refers to the phase of the sinusoidal DDS output remaining substantially fixed or unchanged (i.e., within acceptable system tolerances) for a number of different frequencies and/or frequency changes. For example, the frequency of the DDS output may be switched from any frequency to any other (or to multiple other frequencies) and return in-phase to the original frequency. As used herein, "sinusoidal" refers to a succession of waves similar to a sine wave but does not require a waveform that exactly corresponds to a sine wave. For instance, the output sinusoidal waveform may be in the form of a sine wave, square wave, triangle wave, or other desired waveform shape.

Figure 1:
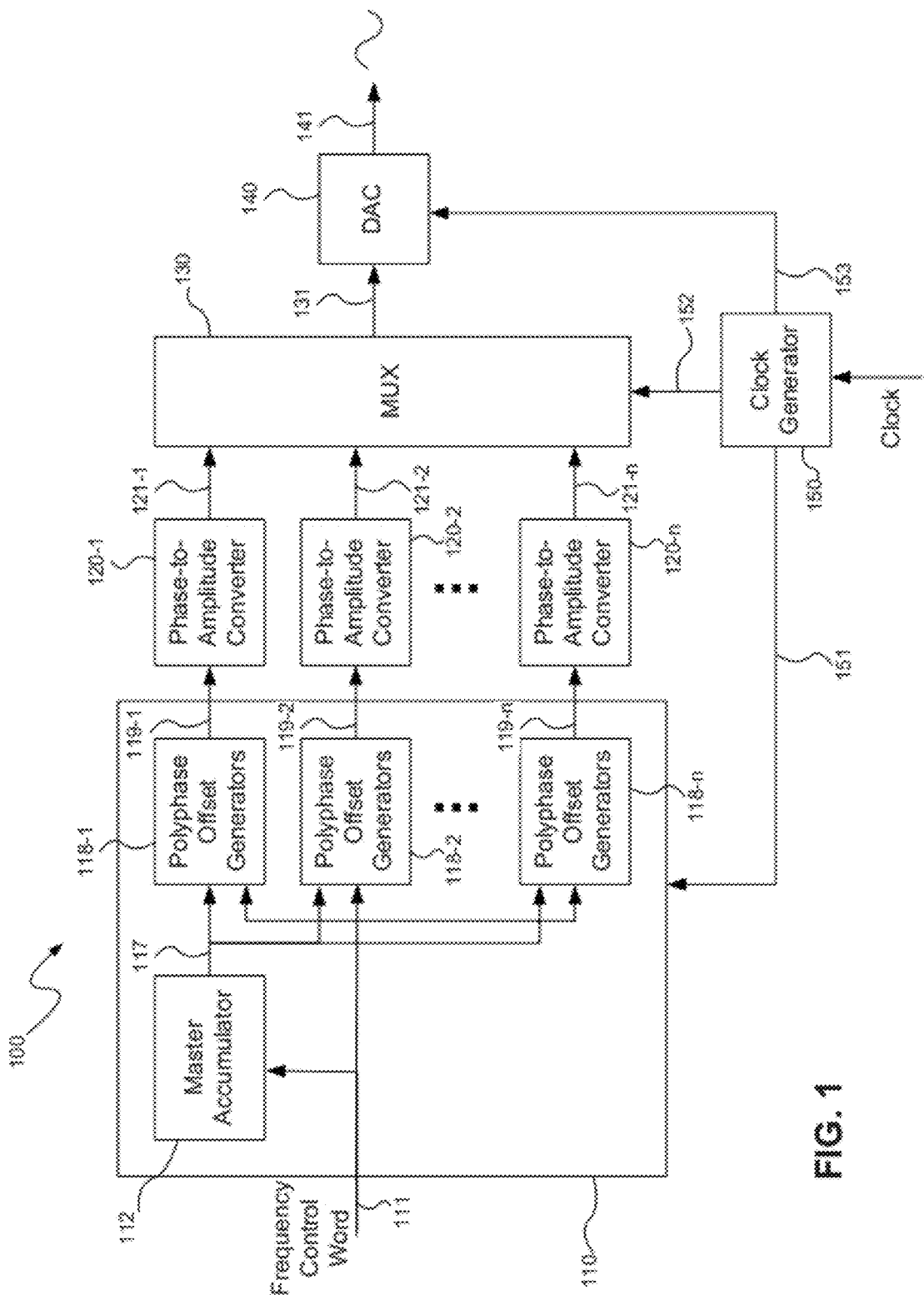
FIG. 1 is a functional block diagram of a direct digital synthesis (DDS) device including a polyphase accumulator generating a reference phase to provide phase coherent outputs, consistent with an embodiment of the present invention.

Referring to FIG. 1, a DDS device 100 with a phase coherent output, consistent with one embodiment of the present invention, includes a polyphase accumulator 110 with a parallel architecture to generate parallel outputs of phase data in the form of digital phase signals 119-1 to 119-n locked to a reference phase. The phase data generally represents phase points on a sinusoidal waveform (e.g., phase angles), and the DDS device 100 determines amplitudes corresponding to the phase points to produce a sinusoidal output signal. The polyphase accumulator 110 generates phase data that increments to step through the phase points for a complete cycle (e.g., the angular phase range of 0° to 360° or 0 to 2π radians) of the sinusoidal waveform.

A frequency control word (FCW) 111 controls the frequency of the sinusoidal output signal because the size of the phase increment of the phase data is based on the FCW 111. In other words, changing the FCW 111 changes the size of the phase increment of the accumulator 110, which changes the speed at which the accumulator steps through the phase points. The phase data on each of the parallel outputs is also based on a multiple of an incrementing reference phase and thus locked to the reference phase, allowing the polyphase accumulator 110 to provide a phase coherent output when the frequency is changed, as described in greater detail below.

According to the exemplary parallel architecture, the DDS device 100 also generally includes a plurality of phase-to-amplitude converters 120-1 to 120-n that convert the phase data represented by the respective digital phase signals 119-1 to 119-n into digital amplitude data in the form of respective digital amplitude signals 121-1 to 121-n. A multiplexer 130 multiplexes the digital amplitude signals 121-1 to 121-n into a multiplexed digital amplitude signal 131. A digital-to-analog converter (DAC) 140 converts the digital amplitude data represented by the multiplexed digital amplitude signal 131 into an analog output to produce an analog sinusoidal output signal 141. The DDS device 100 may further include a clock signal generator 150 to provide one or more clock reference signals 151-153 to the components of the DDS device 100. The clock signal generator 150 may generate the clock reference signals 151-153 at different rates based on an external system clock signal provided to the DDS device 100. Using a parallelized architecture to generate and convert the phase data enables the front end of the DDS device 100 to be operated at higher speeds with a lower clock frequency.

In the exemplary embodiment, the polyphase accumulator 110 generates the phase data on parallel outputs by determining a coarse phase component and a plurality of fine phase components added to the coarse phase component. The coarse phase component is based on the reference phase and both the coarse phase component and the fine phase components are based on the FCW 111. In particular, the polyphase accumulator 110 includes a master accumulator 112 that produces a coarse phase signal 117 representing the coarse phase component of the phase data and a plurality of polyphase offset generators 118-1 to 118-n that produce and add the fine phase components to the coarse phase component to produce the respective digital phase signals 119-1 to 119-n.

The master accumulator 112 increments by a coarse phase increment according to a rate of the clock signal 151 to generate an incrementing reference phase. In one embodiment, a coarse phase increment is equal to the number (n) of parallel paths (i.e., the number of polyphase offset generators 118-1 to 118-n). The master accumulator 112 then multiplies the incrementing reference phase by the FCW 111 to generate the coarse phase signal 117. Each of the polyphase offset generators 118-1 to 118-n multiply the FCW 111 by a fixed fine phase offset to produce fine phase components and add the fine phase components to the coarse phase component represented by the coarse phase signal 117 to produce the digital phase signals 119-1 to 119-n. Thus, the digital phase signals 119-1 to 119-n may all be based on multiples of the same incrementing reference phase and remain locked to that reference phase even when the FCW 111 changes to change the frequency.

Figure 2:
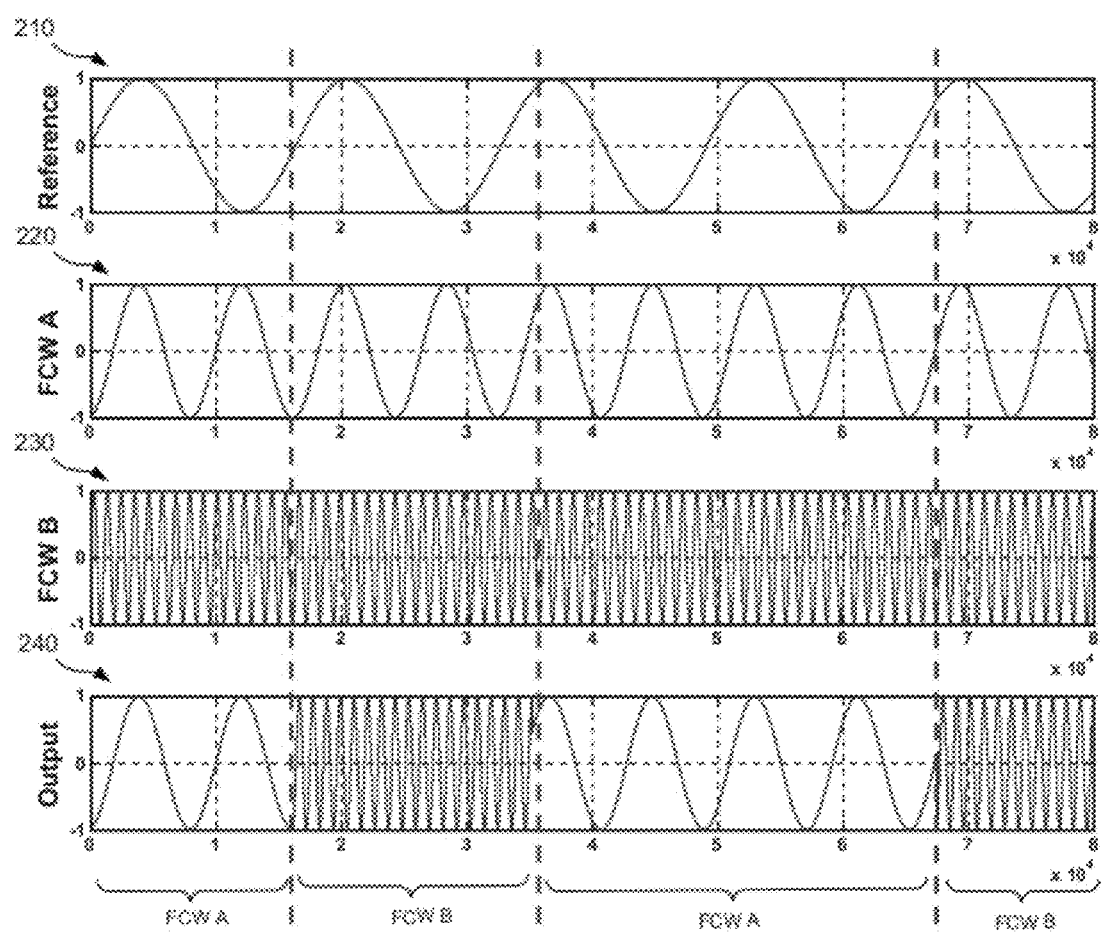
FIG. 2 is a diagram illustrating sinusoidal waveforms of different frequencies with phase coherency, consistent with an embodiment of the present invention.

FIG. 2 illustrates the phase coherency of a DDS device, consistent with embodiments described herein, using exemplary waveforms. The reference waveform 210 represents a waveform generated with a reference frequency corresponding to the incrementing reference phase (i.e., without being multiplied by frequency control word). The FCW A waveform 220 represents a waveform generated with a first frequency using a first frequency control word (FCW A) and the FCW B waveform 230 represents a waveform generated with a second frequency using a second frequency control word (FCW B). The output waveform 240 represents a waveform output from a DDS device with the frequency changing by changing the frequency control word from FCW A to FCW B and back again. Although the frequency of the output waveform 240 changes, the output waveform 240 is based off of multiples of the reference frequency of the reference waveform 210 and thus the phase is coherent for the different output frequencies. As shown, the phase of the output waveform 240 does not change relative to the reference waveform 210 and is thus locked to the reference phase. In other words, the phase of the output waveform 240 remains coherent even after switching the frequency (i.e., between FCW A and FCW B). For illustrative purposes, only two frequencies are shown in FIG. 2; however, the phase coherency property extends to multiple frequencies (i.e., FCW A to FCW B to FCW C, then coherently back to FCW A, then coherently back to FCW C, etc.).

Figure 3:
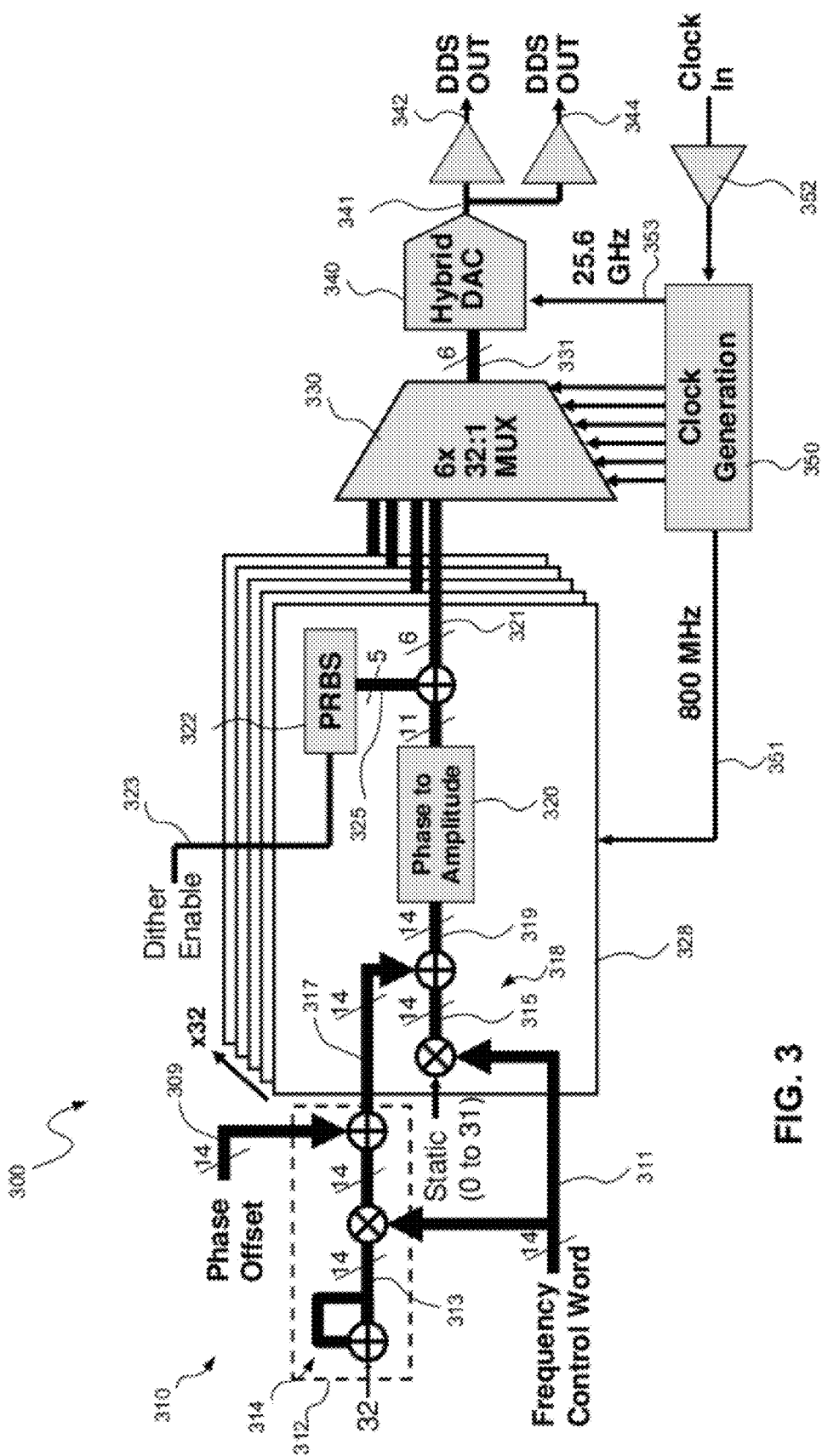
FIG. 3 is a schematic diagram of a DDS device including a polyphase accumulator generating a reference phase to provide phase coherent outputs, consistent with another embodiment of the present invention.

Referring to FIG. 3, another embodiment of a DDS device 300 including a polyphase accumulator 310 is shown and described in greater detail. In this embodiment, the polyphase accumulator 310 includes a master accumulator 312 coupled to thirty-two (32) polyphase offset generators 318. The offset generators 318 and phase-to-amplitude converters 320 may be implemented in respective parallel circuits 328. As mentioned above, the parallel architecture allows the accumulator 310 to operate with a high speed at a lower clock rate. In the DDS device 300 with thirty-two (32) parallel circuits 328, for example, the polyphase accumulator 310 may be operated at 800 MHz. Although the exemplary embodiment shows thirty-two (32) parallel circuits 328, fewer or greater numbers of parallel circuits may also be used (e.g., 16 or 64).

The master accumulator 312 may include a counter 314 that increments by the coarse phase increment (e.g., a binary number) with each clock cycle of a reference clock signal 351 to produce an incrementing reference phase 313. In the illustrated embodiment, the coarse phase increment is thirty-two (32) (e.g., in binary form) corresponding to the number of polyphase offset generators 318. The counter 314 increments by the coarse phase increment until the polyphase accumulator 310 steps through the phase points within one complete cycle of the sinusoidal waveform and then resets to zero. Thus, the incrementing reference phase 313 may repeatedly step through multiple cycles of phase points corresponding to phase angles within a sinusoidal waveform. The master accumulator 312 multiplies a frequency control word (FCW) 311 (e.g., a binary number) by the incrementing reference phase 313 to produce the coarse phase component represented by the coarse phase signal 317. Although the exemplary embodiment shows one master accumulator 312 providing the coarse phase signal 317 to the plurality of polyphase offset generators 318, other embodiments may include multiple master accumulators providing identical copies of the coarse phase signals to one or more offset generators.

In this embodiment, the polyphase accumulator 310 may also include an adjustable phase offset to change the phase of the output signal. In particular, the master accumulator 312 may add a phase offset value (e.g., a binary number) to the coarse phase component. Locking the phase data to the reference phase allows phase coherency for different frequency/phase offset pairs in addition to phase coherency for different frequencies.

Each polyphase offset generator 318 multiplies the FCW 311 by a respective static offset value ranging from 0 to 31 to produce respective fine phase components represented by fine phase signals 315. Each polyphase offset generator 318 then adds the coarse phase component to the respective fine phase components to produce the respective phase data output represented by digital phase signal 319. The master accumulator 312 and the polyphase offset generators 318 may be implemented using circuitry (e.g., adders, multipliers and registers) capable of adding, multiplying and storing digital values, such as the type known by those skilled in the art for use in phase accumulators.

Each phase-to-amplitude converter 320 receives a respective digital phase signal 319 and converts the phase data into digital amplitude data represented by a digital amplitude signal 321. Each phase-to-amplitude converter 320 may be implemented using a sine (or cosine or other periodic function) lookup table with the respective output of the polyphase accumulator 310 serving as the address to the lookup table. Each address in the lookup table may correspond, for example, to a phase point on the sinusoidal waveform from 0° to 360° (or from 0 to $2\pi$ radians) and the lookup table may contain the corresponding digital amplitude data capable of reproducing a complete cycle of the sinusoidal waveform. In other words, one embodiment of the phase-to-amplitude converter 320 maps the phase data to a digital amplitude word. The phase-to-amplitude converter 320 may be implemented using any circuitry capable of converting the phase data into the digital amplitude data such as one or more ROM (Read Only Memory) lookup tables. Although the illustrated embodiment shows the parallel circuit 328 with a single phase-to-amplitude converter 320 receiving a single digital phase signal 319, one or more of the parallel circuits 328 may include multiple phase-to-amplitude converters 320 (e.g., multiple ROMs) receiving multiple copies of the digital phase signal 319.

The DDS device 300 may also using dithering techniques to improve spurious free dynamic range (SFDR) of the DDS device 300. In one embodiment, for example, a pseudorandom binary sequence (PRBS) generator 322 may be coupled to each of the phase-to-amplitude converters 320 to add noise (e.g., in the form of random bits) to the digital amplitude data output from the phase-to-amplitude converters 320 before the digital amplitude data is converted to an analog output. In response to a dither enable signal 323, for example, each PRBS generator 322 may generate a PRBS signal 325 including the random bits that are added to the respective digital amplitude signal 321 output from the respective phase-to-amplitude converter 320. The amplitude dither may result in fewer bits in the digital amplitude signals 321, which allows power savings in the multiplexer 330 and DAC 340.

In the exemplary embodiment, a multiplexer 330 receives the parallel digital amplitude signals 321 and combines the signals 321 into a multiplexed digital amplitude signal 331. The multiplexer 330 may be implemented using any circuitry capable of multiplexing a plurality of multiple bit digital signals into a single multiplexed digital signal, such as a 32:1 digital multiplexer.

In the exemplary embodiment, a DAC 340 receives the multiplexed digital amplitude signal 331 and converts the digital amplitude data into an analog output to produce an analog sinusoidal output signal 341. The analog sinusoidal output signal 341 may be provided on one or more outputs 342, 344. The DAC 340 may be implemented using any circuitry capable of converting a digital input into an analog output (e.g., current or voltage). The DAC 340 may include, for example, a hybrid DAC such as a 6 bit RTZ DAC that uses a hybrid thermo-coding and R2R architecture. Because the 32 outputs are multiplexed, the clock generator 350 provides a clock signal 353 to the DAC 350 at a higher clock rate (e.g., 25.6 GHz) than the clock signal 351 (e.g., 800 MHz) provided to the front end of the DDS device 310.

Figure 4:
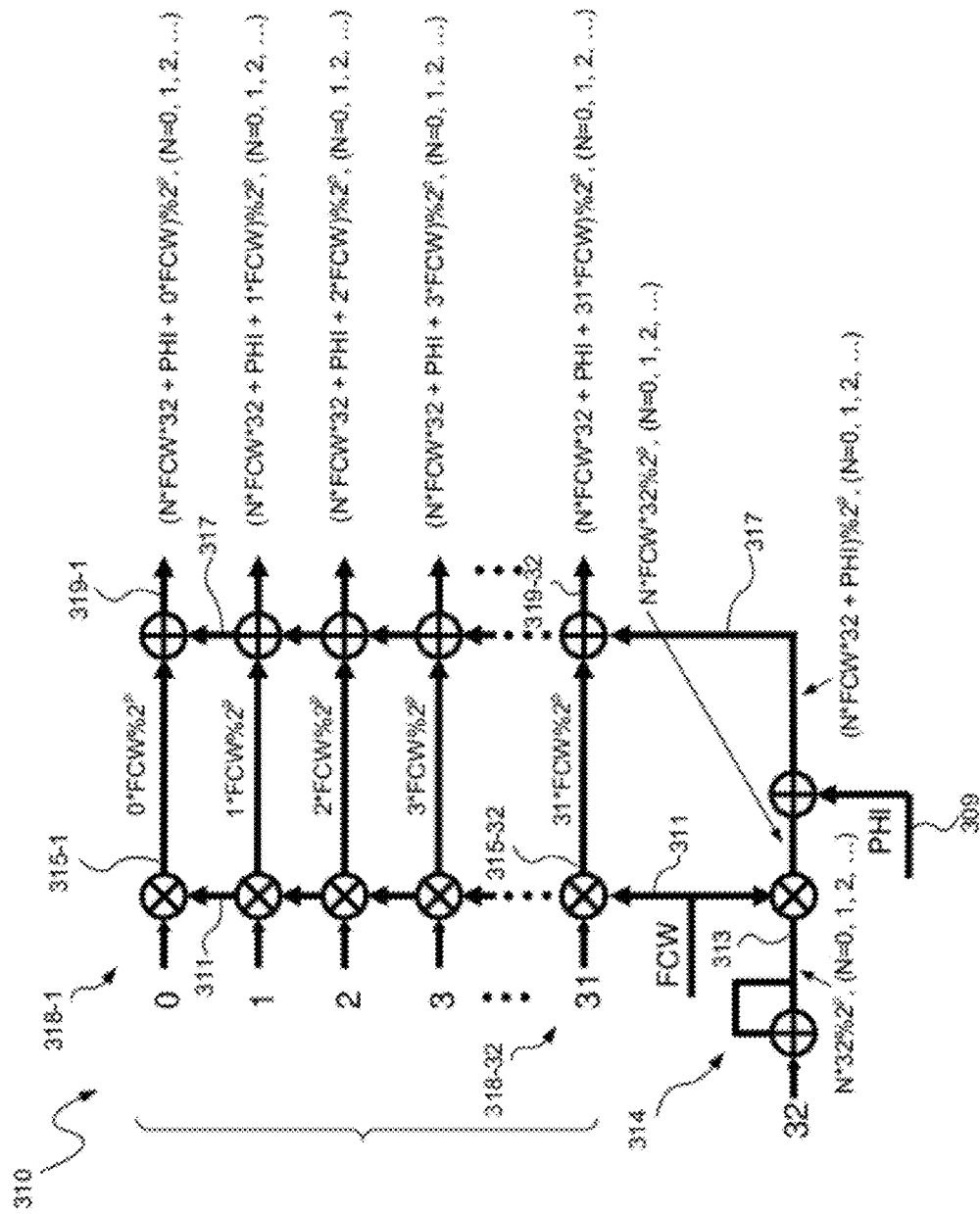
FIG. 4 is a schematic diagram illustrating operation of a polyphase accumulator that may be used in the DDS device shown in FIG. 3.

FIG. 4 illustrates the operation of the polyphase accumulator 310 in greater detail including mathematical expressions representing the digital data outputs at various points in the accumulator 310. In an exemplary embodiment, the polyphase accumulator 310 may be implemented as a modulo accumulator that increments until the accumulator overflows and resets to zero, which allows the accumulator 310 to step through the phase points for a complete cycle of a sinusoidal waveform and then repeat the cycle. The number of phase points within the cycle of the accumulator 310 may be represented by the modulo operation %$2^p$ and depends upon the width p of the accumulator (e.g., in bits). In the illustrated embodiment, the width of the polyphase accumulator 310 is 14 bits and the accumulator 310 may step through $2^{14}$ possible phase points before it overflows. Other widths are also possible depending upon the desired resolution of the accumulator (i.e., the number of discrete phase points).

In the mathematical expressions, N represents the number of incremental steps, p represents the width of the accumulator in bits, FCW represents the frequency control word, PHI represents the phase offset, and %$2^p$ represents the modulo operation. If p=14, FCW=1 and PHI=0, for example, the incrementing reference phase 313 output from the counter 314 and the coarse phase signal 317 output from the master accumulator 312 may include data represented as 0, 32, 64, 96, ..., 16381, 93, 189, ...; the first digital phase signal 319-1 may include data represented as 0, 32, 64, 96, ..., 16352, 0, 32, ...; and the thirty-second digital phase signal 319-32 may include data represented as 31, 63, 95, 127, ..., 16383, 31, 63, .... The digital phase signals 319-2 to 319-31 between the first and thirty-second digital phase signals are similar but with different fine phase offsets.

Thus, a larger FCW 311 results in a larger increment of the coarse phase component (N*FCW*32+PHI) represented by the coarse phase signal 317 and a larger fine phase component (0*FCW to 31*FCW) represented by each of the fine phase signals 315-1 to 315-32, and a larger phase increment in the resulting phase data represented by the digital phase signals 319-1 to 319-32. The larger phase increment in the phase data thus causes the polyphase accumulator 310 to step more quickly through the phase points within a cycle of the sinusoidal waveform. Also, each of the phase data outputs represented by the digital phase signals 319-1 to 319-32 is based on a multiple of the incrementing reference phase (N*32) even when the FCW 311 is changed and thus is locked to the reference phase to provide phase coherency. The exemplary polyphase accumulator 310 also achieves this phase coherency without sacrificing fast switching time or frequency agility.

Figure 5:
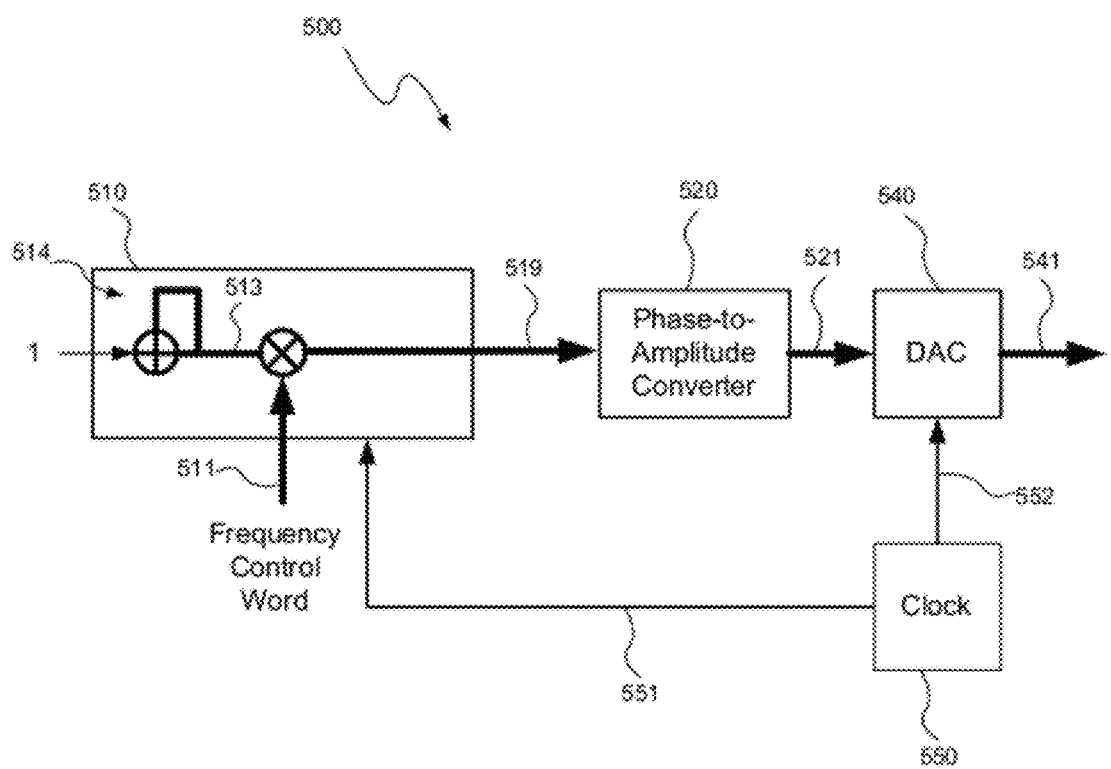
FIG. 5 is a schematic block diagram of a monophase DDS device with a phase accumulator generating a reference phase to provide phase coherent outputs, consistent with a further embodiment of the present invention.

Referring to FIG. 5, a further embodiment of a DDS device 500 with a phase coherent output is shown and described. In this embodiment, the DDS device 500 includes a phase accumulator 510 including a counter 514 that increments by one (1) to produce the incrementing reference phase 513. The phase accumulator 510 multiplies the incrementing reference phase 513 by a frequency control word (FCW) 511 to produce a digital phase signal 519 representing the phase data corresponding to phase points on a sinusoidal waveform.

The DDS device 500 also includes a phase-to-amplitude converter 520, such as a ROM lookup table, that converts the phase data represented by the digital phase signal 519 into digital amplitude data, for example, as described above. The DDS device 500 further includes a DAC 540 that converts the digital amplitude data into an analog output to produce an analog sinusoidal output signal 542. A clock generator 550 generates clock signals 551, 552 used by the DDS device 500. As discussed above, the FCW 511 determines the frequency of the output signal 541 and the digital phase signal 519 is based on a multiple of the incrementing reference phase 513 such that the output signal 541 remains locked to the reference phase 513 even when the frequency is changed by changing the FCW 511.

The circuitry used to implement the components and/or functions of the DDS devices described herein may be implemented using integrated circuits, for example, including CMOS logic. The disclosed techniques can be implemented in any number of configurations, including integrated system-on-chip or chip set configurations as well as on printed circuit boards configured with various discrete DDS system components. In addition, any number of suitable process technologies and material systems can be used in fabricating the DDS system. For example, for higher speed applications (e.g., in excess of GHz), the DDS system can be implemented, for instance, in heterojunction bipolar transistor (HBT) and/or high electron mobility transistor (HEMT) technology. However, if such high speeds are not necessary (e.g., less than 2 GHz), then other technologies such as complementary metal oxide semiconductor (CMOS) technology can be utilized. Example materials from which the system can be implemented include III-V material systems such as gallium arsenide (GaAs) or indium phosphide (InP), or other suitable semiconductor material systems.

In other embodiments, one or more components or functions of the DDS devices described herein may be implemented using software, firmware or any combination thereof, for example, stored on or in a storage medium and executed by a processor.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A direct digital synthesis (DDS) device comprising:
a polyphase accumulator configured to generate a plurality of digital phase signals in response to a clock signal and a frequency control word, each of the digital phase signals representing phase data corresponding to phase points on a sinusoidal waveform, the phase data being based on multiples of the frequency control word and an incrementing reference phase such that the digital phase signals remain locked to the incrementing reference phase to provide phase coherency when the frequency control word changes;
a plurality of phase-to-amplitude converters coupled to the polyphase accumulator and configured to produce a plurality of digital amplitude signals in response to the digital phase signals, respectively, the digital amplitude signals representing digital amplitude data corresponding to the phase points on the sinusoidal waveform;
a multiplexer coupled to the phase-to-amplitude converters and configured to multiplex the digital amplitude signals from the phase-to-amplitude converters to produce a multiplexed digital amplitude signal; and
a digital-to-analog converter coupled to the multiplexer and configured to convert the digital amplitude data represented by the multiplexed digital amplitude signal into an analog output to produce an analog sinusoidal signal.

2. The DDS device of claim 1 wherein the polyphase accumulator comprises:
at least one master accumulator configured to generate the incrementing reference phase in response to the clock signal and configured to multiply the incrementing reference phase by the frequency control word to produce a coarse phase signal representing a coarse phase component of the phase data; and a plurality of polyphase offset generators coupled to the master accumulator, each of the polyphase offset generators being configured to multiply respective fixed phase offsets by the frequency control word to produce fine phase signals representing fine phase components of the phase data and configured to add the coarse phase component and the fine phase components to produce the respective digital phase signals.

3. The DDS device of claim 2 wherein the master accumulator is configured to receive an adjustable phase offset and to add the adjustable phase offset to the coarse phase component.

4. The DDS device of claim 2 wherein the master accumulator comprises a counter configured to increment by a coarse phase increment in response to each clock pulse of the clock signal to produce the incrementing reference phase, wherein the coarse phase increment is a number corresponding to a number of the polyphase offset generators.

5. The DDS device of claim 4 wherein the counter is configured to increment until the polyphase accumulator steps through the phase points within one complete cycle of the sinusoidal waveform and then reset to zero.

6. The DDS device of claim 5 wherein the counter is configured to truncate polyphase accumulator overflows according to a modulo operation when the polyphase accumulator exceeds $2^p$ phase points where p is the width of the accumulator in bits.

7. The DDS device of claim 5 wherein the coarse phase increment and number of polyphase generators is $2^N$, where N is a positive integer.

8. The DDS device of claim 1 further comprising a plurality of analog sinusoidal signal outputs coupled to the digital-to-analog converter.

9. The DDS device of claim 1 wherein the phase-to-amplitude converters include lookup tables.

10. The DDS device of claim 1 further comprising dithering circuits coupled to the phase-to-amplitude converters.

11. A DDS device comprising:
a phase accumulator configured to produce an incrementing reference phase in response to a clock signal and configured to multiply the incrementing reference phase by a frequency control word to produce a digital phase signal representing phase data corresponding to phase points on a sinusoidal waveform, wherein the digital phase signal remains locked to the incrementing reference phase to provide phase coherency when the frequency control word changes;
a phase-to-amplitude converter coupled to the phase accumulator, the phase-to-amplitude converter being configured to receive the digital phase signal and to provide a digital amplitude signal in response to the digital phase signal, the digital amplitude signal representing digital amplitude data corresponding to the phase points on the sinusoidal waveform; and
a digital-to-analog converter coupled to the phase-to-amplitude converter, the digital-to-analog converter being configured to receive the digital amplitude signal and to convert the digital amplitude data represented by the digital amplitude signal into an analog output to produce an analog sinusoidal signal.

12. The DDS device of claim 11 wherein the phase accumulator is configured to receive an adjustable phase offset and to add the adjustable phase offset to the digital phase signal.

13. The DDS device of claim 11 wherein the phase accumulator comprises a counter configured to increment by a phase increment in response to each clock pulse of the clock signal to produce the incrementing reference phase.

14. The DDS device of claim 13 wherein the counter is configured to increment until the phase accumulator steps through the phase points within one complete cycle of the sinusoidal waveform and then reset to zero.

15. The DDS device of claim 14 wherein the counter is configured to truncate phase accumulator overflows according to a modulo operation when the phase accumulator exceeds $2^p$ phase points where p is the width of the accumulator in bits.

16. A method for direct digital synthesis, the method comprising:
producing at least one digital phase signal in response to a clock signal and a frequency control word, the digital phase signal representing phase data corresponding to phase points on a sinusoidal waveform, the phase data being based on multiples of the frequency control word and an incrementing reference phase such that the digital phase signal remains locked to the incrementing reference phase to provide phase coherency when the frequency control word changes;
converting the phase data represented by the digital phase signal into digital amplitude data to produce at least one digital amplitude signal in response to the at least one digital phase signal, the digital amplitude data corresponding to the phase points on the sinusoidal waveform; and
converting the digital amplitude data represented by the digital amplitude signal into an analog output to produce an analog sinusoidal signal.

17. The method of claim 16 wherein producing at least one digital phase signal comprises:
multiplying the frequency control word and the incrementing reference phase to produce a coarse phase signal representing a coarse phase component of the phase data;
multiplying the frequency control word and a plurality of fixed phase offsets to produce a plurality of fine phase signals, respectively, representing fine phase components of the phase data; and
adding the coarse phase component represented by the coarse phase signal with each of the fine phase components represented by the fine phase signals to produce a plurality of digital phase signals, respectively.

18. The method of claim 17 wherein the phase data represented by the plurality of digital phase signals is converted into the digital amplitude data to produce a plurality of digital amplitude signals, and further comprising multiplexing the digital amplitude signals to produce a multiplexed digital amplitude signal, and wherein the multiplexed digital amplitude signal is converted into the analog sinusoidal signal.

19. The method of claim 16 further comprising changing the frequency control word to change a frequency of the analog sinusoidal signal, wherein the phase of the analog sinusoidal signal remains coherent through frequency changes.

20. The method of claim 16 wherein producing the at least one digital phase signal comprises incrementing a counter by a reference phase increment in response to each clock pulse of the clock signal until the phase data completes a cycle of the sinusoidal waveform and then resetting the counter.

* * * * *